United States Patent [19]
Chalk

[11] 3,942,839
[45] Mar. 9, 1976

[54] SPOKED WHEEL AND METHOD OF MAKING SAME

[76] Inventor: Thomas O. Chalk, P.O. Box 446, St. Cloud, Fla. 32769

[22] Filed: July 30, 1974

[21] Appl. No.: 493,669

[52] U.S. Cl. ............... 301/73; 301/104; 29/159.02; 416/230; 301/37 SA
[51] Int. Cl.² ......................................... B60B 1/06
[58] Field of Search ........... 301/37 SA, 104, 73, 75; 40/129 B, 60; 416/195, 230; 29/159 R, 159.01, 159.02

[56] References Cited
UNITED STATES PATENTS

| | | | |
|---|---|---|---|
| 689,371 | 12/1901 | Stutsman | 301/60 |
| 2,855,179 | 10/1958 | Brown | 416/230 |
| 3,606,474 | 9/1971 | Meiklejohn | 301/60 |

Primary Examiner—Robert B. Reeves
Assistant Examiner—D. W. Keen
Attorney, Agent, or Firm—Clarence A. O'Brien; Harvey B. Jacobson

[57] ABSTRACT

A spoked wheel and method of making same including a peripheral rim, a central hub and a plurality of spokes interconnecting the hub and rim in which the hub is provided with spaced flanges interconnected by a tubular spindle and the spokes are in the form of wire members extending between the rim and the respective flanges. The wire spokes are of fixed, non-adjustable length and are tensioned simultaneously and equally by expanding the distance between the hub flanges with the spindle being inserted therebetween in order to maintain the flanges spaced apart. Airfoil blades may be mounted on the outer portion of certain of the spokes to enable utility of the wheel as a wind turbine, fan, propeller on a hovercraft or the like.

2 Claims, 8 Drawing Figures

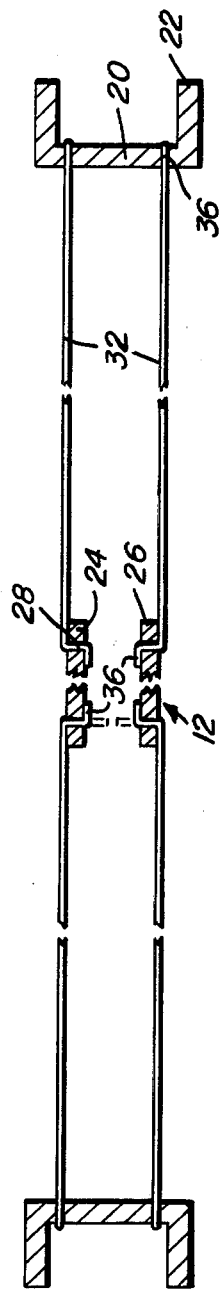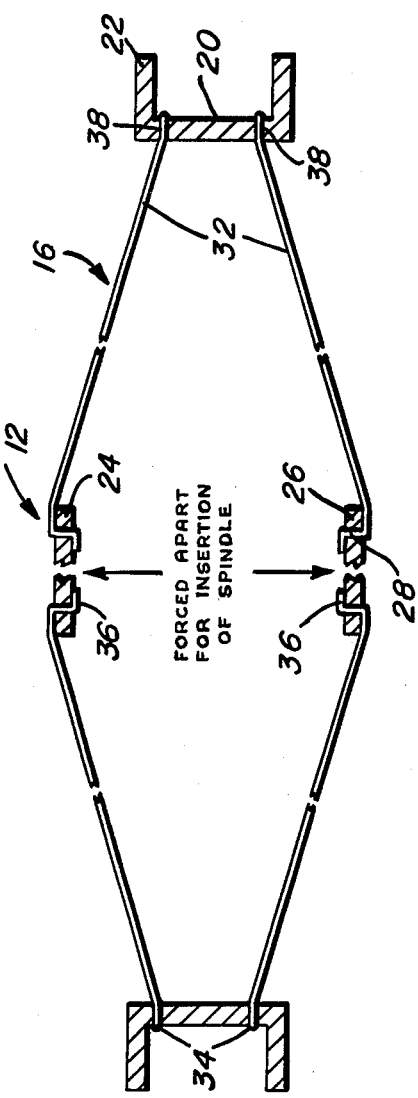

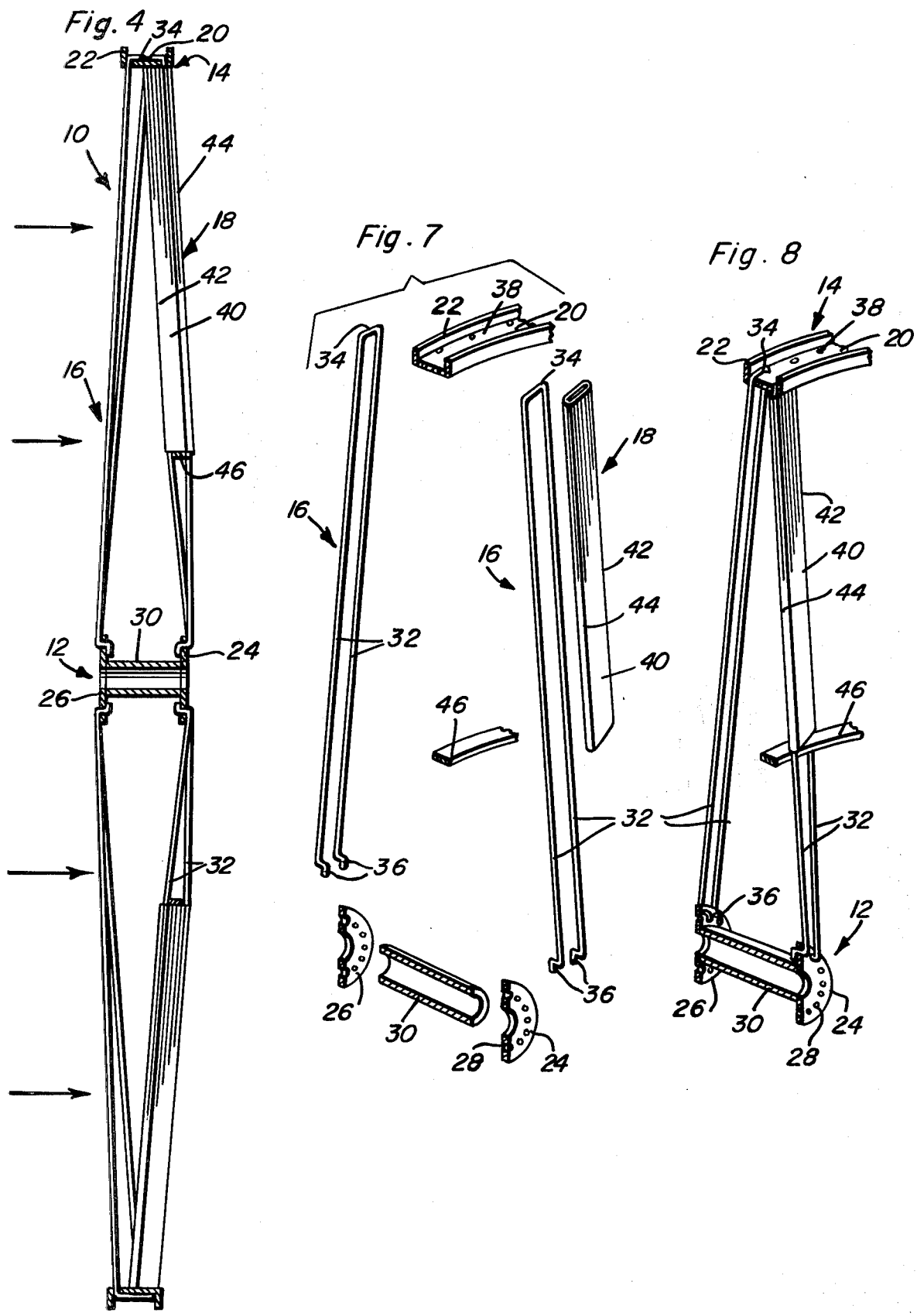

SPOKED WHEEL AND METHOD OF MAKING SAME

BACKGROUND OF THE INVENTION

1. Field of the Invention

The present invention generally relates to a spoked wheel and the method of making the wheel in which the spokes are disposed in longitudinally spaced radial planes which converge toward the rim of the wheel and diverge toward the hub of the wheel with the spokes being constructed of wire members of fixed, non-adjustable length and tensioned simultaneously and equally by increasing the distance between the points of attachment to the hub when making the wheel.

2. Description of the Prior Art

Many types of spoked wheels have been constructed with the structural characteristics of the wheel being varied depending upon the intended utility. Usually, such wheels include relatively heavy and rigid spokes. In some instances, the spokes are capable of adjustable tensioning by the use of screw-threaded elements incorporated into the spokes with one example of this type of construction being a conventional bicycle wheel and other similar types of wire spoked wheels. One of the problems in the construction of this type of wheel is unequal tensioning of the spokes which frequently results in bending or deflection of the rim of the wheel and eccentric orientation of the hub. When such wheels are constructed of rigid materials, they become quite heavy and when such wheels are constructed with a relatively large diameter, they also are quite heavy. In view of these problems, spoked wheels with a hub and rim have not been used in certain instances. For example, the provision of airfoils on the spokes for use as a wind turbine, fan, propeller or the like has not found acceptance although efforts have been made to utilize such structures as exemplified by certain of the following U.S. Pat. Nos.

| | | | |
|---|---|---|---|
| 3,373,928 | 3/19/68 | 2,855,179 | 10/7/58 |
| 548,171 | 10/22/95 | 3,572,969 | 3/30/71 |
| 1,010,337 | 11/28/11 | 194,140 | 8/14/77 |
| 565,414 | 8/4/96 | 458,602 | 9/9/90 |
| 653,615 | 7/10/00 | 756,216 | 4/5/04 |
| 959,392 | 5/24/10 | 436,148 | 9/9/90 |
| 1,046,814 | 12/10/12 | 1,233,232 | 7/10/17 |
| 1,888,795 | 11/22/32 | 2,517,135 | 8/1/50 |
| 943,732 | 12/21/09 | 556,803 | 3/24/96 |
| 1,820,529 | 8/25/31 | 1,352,960 | 9/14/20 |

SUMMARY OF THE INVENTION

An object of the invention is to provide a spoked wheel which is economical in manufacture, of lightweight construction and provided with high strength and durability with the wheel being constructed in a unique manner.

Another object of the invention is to provide a spoked wheel and a unique method of constructing such a wheel in which the wheel includes a peripheral rim and a central hub assembly interconnected by wire spokes of a fixed length with the unique method of assembly resulting in simultaneous and equal tensioning of the wire spokes by expanding the distance between the hub flanges to which the spokes are connected.

A further object of the invention is to provide a spoked wheel and method as set forth in the preceding objects capable of effective use as a wind turbine by mounting airfoil blades on the outer portions only of the spokes in a manner to utilize the wind force in generating electrical energy or otherwise harnessing the forces of the wind for practical purposes or utilizing the wheel as a fan or propeller in a hovercraft, helicopter, or the like.

Still another object of the invention is to provide a spoked wheel and method in which the rim may be constructed in a manner to facilitate peripheral drive connection to a power output to utilize the relatively high linear speed at the periphery of the wheel for driving a generator or the like.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a sectional view of the wheel rim, hub flanges and spokes during an initial step in the method of making the spoked wheel.

FIG. 2 is a view similar to FIG. 1 but illustrating the hub flanges being moved apart for receiving a spindle thus expanding the distance between the points of attachment of the spokes with the hub assembly for simultaneously tensioning all of the spokes.

FIG. 4 is a sectional view extending through the center of the wheel illustrating the structural features of the rim, spokes, hub and airfoil blades.

FIG. 7 is an exploded group perspective view illustrating a portion of the rim, spokes and hub assembly.

FIG. 8 is a fragmental perspective view illustrating the components of FIG. 7 in assembled condition with the airfoil blade mounted on one of the spokes.

DESCRIPTION OF THE PREFERRED EMBODIMENT

Figure 3:
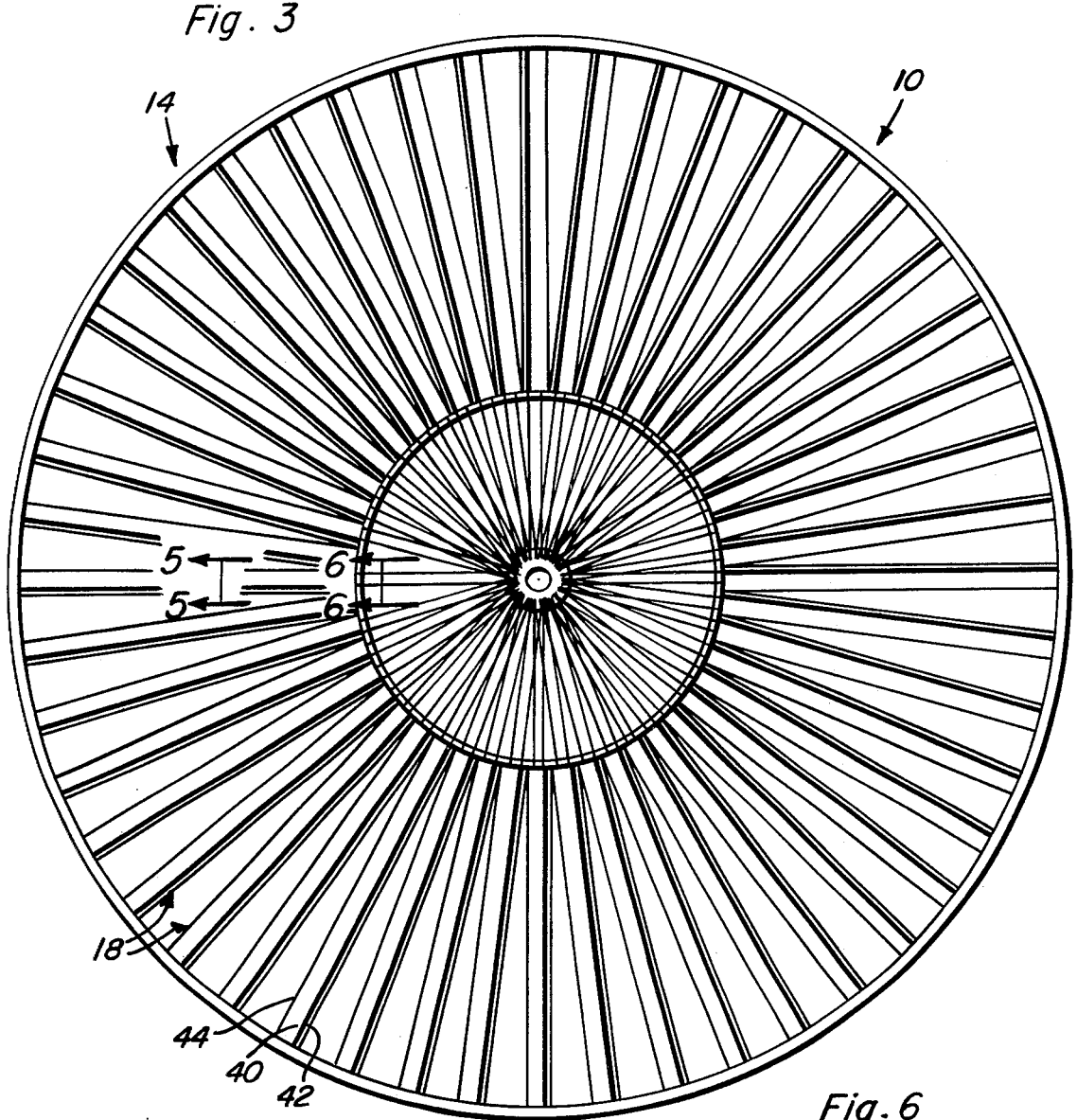
FIG. 3 is an elevational view of the spoked wheel constructed in accordance with the present invention utilized as a wind wheel or turbine.
Figure 5:
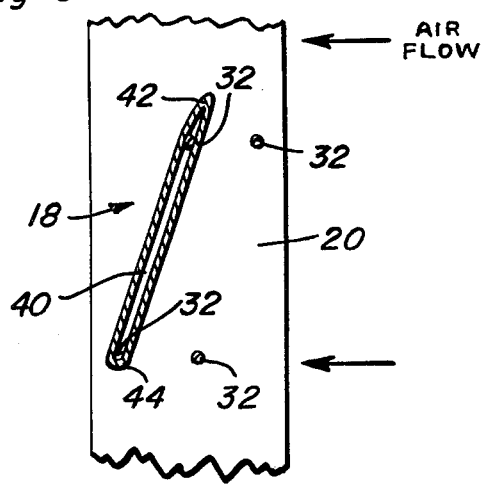
FIG. 5 is a detailed sectional view taken substantially upon a plane passing along section line 5—5 of FIG. 3 illustrating further structural details of one of the spokes and airfoil blade mounted thereon.

Referring to the drawings, the spoked wheel of the present invention is generally designated by numeral 10 and includes a central hub assembly 12, a peripheral rim 14 and a plurality of spokes 16 associated in a manner to provide a spoked wheel.

As illustrated in FIGS. 1 and 2, the rim 14 is of channel-shaped configuration although it may be of other shapes and configurations as desired with the rim including a web 20 and a pair of outwardly projecting flanges 22 oriented at the edges of the web. The rim 14 is of rigid continuous construction and may be formed in any suitable manner such as extruded in a curved manner so that the ends of the circular extrusion could be joined or it may be formed in a segmental manner with the arcuately curved segments being joined in any suitable manner. Also, as stated, the rim may be of channel-shaped configuration or of any other desired configuration with the web or plate 20 being necessary in order to provide a structure to which the spokes 16 are connected.

The hub assembly 12 includes a pair of circular flanges 24 and 26 each of which is provided with a plurality of spaced holes 28 for receiving the inner ends of the spokes 16. The flanges 24 and 26 are spaced apart by and rigidly connected to a central cylindrical spindle 30 in the form of a tubular member to provide a central hub assembly by which the wheel 10 may be rotatably supported on a suitable shaft, rod or other suitable support structure by suitable bearings and the like.

Each spoke 16 is constructed of wire and includes a pair of generally parallel radially extending wire members 32 interconnected at their outer ends by a short central portion 34 and provided with offset free ends 36 as illustrated in FIG. 7. The spokes 16 are assembled with the rim 20 by inserting the two wire members 32 through a pair of adjacent holes 38 in the web or plate 20 of the rim 14 and the offset ends 36 are then threaded into holes 28 in the flange 24 or flange 26 as illustrated in FIG. 1.

The spokes 16 are of generally U-shaped configuration with the central bight portion 34 disposed against the outer surface of the rim 14 and the free ends 36 being initially disposed at 90° to the members 32, inserted through the holes 28 and then bent at 90° back into parallel relation to the members 32 but offset in relation thereto thereby securely joining or connecting the spokes 16 to the hub assembly 12. As illustrated, the spokes 16 are disposed in two generally conical planes with the planes converging toward the rim and diverging toward the hub assembly. It is pointed out that each spoke may be a single wire member anchored to the rim and flange in any suitable manner.

As illustrated in FIGS. 1 and 2, the manner of assembly of the spokes with the rim and hub flanges is set forth in a schematic manner with the manner of joining the spokes to the hub flanges being illustrated specifically in FIG. 1. FIG. 2 illustrates the manner in which the spokes are tensioned by forcing the flanges 24 and 26 apart so that the spindle 30 can be inserted therebetween and secured thereto in any suitable manner. For example, outer bearing races may be partially fitted into the ends of the spindle and partially received in the flanges to rigidly connect these components by press fitting or other well known techniques. When the flanges 24 and 26 are expanded or spread apart as indicated in FIG. 8, the spokes 16 which are nonadjustable and of fixed length will be tensioned due to their movement from a substantially parallel condition as illustrated in FIG. 1 to the inclined positions illustrated in FIG. 2. The tension in each of the spokes will be equal and this tensioning of the spokes is accomplished without the use of any screw-threaded adjustment devices or the like and enables the tensile strength of the wire from which the spokes are constructed to be effectively utilized thereby maintaining the lightweight characteristics of the wheel as compared with rigid, relatively heavy spokes welded to the rim and hub flange as in conventional construction.

Airfoils or blades 18 are mounted on one set of spokes 16 to enable the spoked wheel 10 to be utilized effectively as a wind turbine, fan, propeller for a hovercraft, helicopter or the like. As illustrated, the spoked wheel is adapted for use as a wind turbine with the blades 18 being mounted on the spokes 16 in a manner that air or wind blowing into the wind wheel in the manner indicated by the directional arrows in FIG. 4 will cause rotation of the wheel 10. The blades 16 are in the form of hollow envelopes 40 having the configuration of an airfoil from the leading edge 42 thereof to the trailing edge 44 with the hollow envelope being wrapped around a pair of wire members 32 forming the spokes 16. Thus, there are two wire members 32 inside each of the hollow blades 18, one in the leading edge 42 and one in the trailing edge 44 in a manner that the wire members 32 are wedged snugly inside the blade. With this construction, the orientation of the holes 38 in the rim web 20 determine the pitch of the blades 18 at their outer tip. The blades 18 may be fabricated from lightweight material such as sheet aluminum, plastic or even a fabric material. Also, since the portion of the blade nearest the hub on a wind turbine does very little to increase the performance and power output of such a turbine, the blades 18 are disposed only toward the outer end portion of the spokes. The inner ends of the blades terminate in substantially spaced relation to the hub assembly with only the bare wires 32 extending from the hub flanges to the inner ends of the blades.

Figure 6:
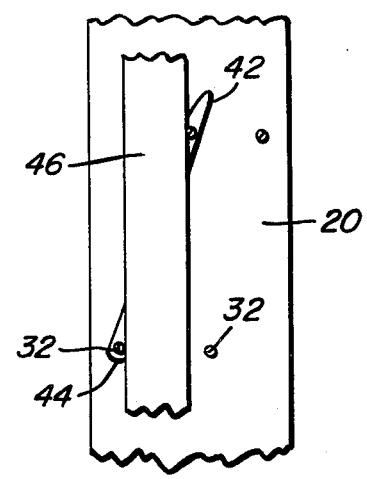
FIG. 6 is a sectional view taken substantially upon a plane passing along section line 6—6 of FIG. 3 illustrating further structural details of a spoke and the association of an inner ring therewith for varying the pitch of the blade at the inner end.

When the spoked wheel rotates, the inner ends or tips of the blades travel at a lower velocity than the outer ends or outboard tips of the blades and for this reason, the inboard tips of the blades 18 are provided with a slightly greater pitch which is accomplished by arranging the wire members 32 so that they are not exactly parallel, that is, they gradually diverge from the rim inwardly. To provide this divergence and to maintain this divergence, an inner rim or ring 46 is provided which is disposed between the adjacent wires 32 of the spokes 16 as illustrated in FIGS. 6 and 8. FIG. 6 illustrates specifically the manner in which the inner rim 46 is associated with the wire members 32 to maintain the inboard tip of the propeller blade with a greater pitch than the outboard tip. The inner rim 46 may be secured to the blades or may be provided with holes receiving the wire members 32 or may be retained in position by the wire members 32 which converge toward each other so that they attach to the circular flange 24 as illustrated in FIGS 4 and 8.

With this construction, the blades 18 have a gradual twist from the outboard tip to the inboard tip so that the optimum pitch can be established at each end of the blade. The inboard rim 46 also provides a much more rigid construction for the inboard tips of the blades and eliminates any tendency of the blades to flutter at relatively high velocity. In order to provide the best overall aerodynamic shape for utilizing energy from the wind, the blades are installed on only the rear set of spokes 16 as indicated in FIG. 4. If desired, a nose cone or other deflecting device may be provided for directing the wind into the blades 18 and the web 20 of the rim 14 serves somewhat as an air duct to prevent air spilling from the peripheral tips or outboard tips of the blades 18. Also, the channel-shaped construction of the rim 14 enables an effective power take-off from the periphery of the wheel. For example, a belt drive may be engaged with the web 20 which may be specifically adapted for receiving a V-belt or the like. The use of this type of spoked wheel in a wind turbine provides for a lightweight structure which has extremely high efficiency in the use of the energy of the wind. For example, well known Dutch windmills having four radiating arms have an efficiency of about 15 percent of the available energy of the wind while the familiar multi-bladed windmill used for pumping water on farms utilizes about 30 percent of the energy whereas the present spoked wheel constructed in the manner illustrated utilizes in excess of 50 percent of the wind's energy and in addition has an extremely high starting torque and can be used when wind speeds are so low that conventional windmills would not even be turning. By driving a generating device from the periphery of the rim, one of the big problems in generating electricity with wind has been solved since conventional windmills deliver their power at the relatively slow turning center shaft which rotational speed must be increased through one or more stages of gearing or belting to be able to drive a typical generator or alternator. This device, on the other hand, driving from the periphery of the rim provides a relatively high linear output speed. In an actual test model in which the spoked wheel is 15 feet in diameter, the spoked wheel weighing approximately 70 pounds will produce approximately 246 kilowatts per day when operating in a wind of 30 miles per hour which is several times more than the average household consumption of electricity. The particular size, output characteristics and the like, of course, may be varied depending upon installational requirements and various means may be provided for limiting the maximum rotational speed of the device and various support structures may be provided for maintaining proper orientation of the spoked wheel in relation to the direction of the wind when used as a wind turbine.

In addition, the device may have other utility including use as a fan, use as a propeller for a hovercraft, helicopter or the like in which event various adaptations may be made for rendering it operative for the particular purposes intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A spoked wheel comprising an annular rim of rigid construction, a central hub assembly, and a plurality of radially extending spokes interconnecting the rim and hub assembly, said spokes being of fixed, non-adjustable length, said hub assembly including spaced end flanges having a spindle extending therebetween, said spokes being wire members with a plurality of wire members extending from each of the flanges to the rim and being equally tensioned by expanding the distance between the flanges when positioning the spindle therebetween, each of said spokes being of generally U-shaped configuration with parallel wire members interconnected by an outer end wire portion of relatively short length with the two wire members being inserted radially inwardly through spaced holes in the rim, the two wire members having inner free ends connected to a flanges of the hub assembly, and a blade mounted on each pair of wire members extending from the rim to one of the flanges, each blade being in the form of an airfoil and disposed only toward the outer portion of the spokes, each blade being hollow and in the form of an envelope with the wire members being disposed in the leading and trailing edges thereof, and an inner rim at the inboard tips of the blades and disposed between the wire members defining each spoke to enable variation in pitch of the blades from their outboard tips to their inboard tips.

2. The method of making a spoked wheel comprising the step of forming an annular rim of circular configuration, connecting a plurality of radially disposed spokes to the rim, connecting the end portions of alternate spokes to central flanges and spreading the flanges apart and placing a spacing device therebetween thereby equally tensioning all of said spokes, each spoke being constructed of wire and the step of connecting the spokes to the rim includes the step of passing the two ends of a wire through adjacent holes in the rim from the outer surface to the inner surface so that the central portion of the wire engages the outer periphery of the rim, the end portions of the wire extending radially inwardly with the free ends thereof connected to a flange, and mounting an airfoil blade on each spoke extending from the rim to one of the flanges by enclosing the portions of the wire inwardly of the rim to a point spaced from the flange, and varying the pitch of the blades from the outboard tip to the inboard tip by inserting an inner rim between the portions of the wire at the inboard tips of the blades.

* * * * *